3,796,766
OLEFIN HYDROISOMERIZATION PROCESS
John C. Hayes, Palatine, Roy T. Mitsche, Island Lake, Richard E. Rausch, Mundelein, and Frederick C. Wilhelm, Arlington Heights, Ill., assignors to Universal Oil Products Company, Des Plaines, Ill.
No Drawing. Continuation-in-part of application Ser. No. 232,905, Mar. 8, 1972, now Patent No. 3,697,393, which is a division of application Ser. No. 56,008, July 17, 1970, now Patent No. 3,720,628, which in turn is a continuation-in-part of application Ser. No. 34,539, May 4, 1970, now Patent No. 3,660,309. This application Feb. 5, 1973, Ser. No. 329,508
Int. Cl. C07c 5/22
U.S. Cl. 260—676 R                    8 Claims

ABSTRACT OF THE DISCLOSURE

Hydroisomerizable olefins are hydroisomerized utilizing a catalytic composite containing catalytically effective amounts of a platinum group component and a Group IV-A metallic component combined with a carrier material of alumina and a finely divided crystalline aluminosilicate such as mordenite. Also disclosed is a catalytic composite comprising a platinum group component, a Group IV-A metallic component and a Friedel-Crafts metal halide component combined with a carrier material of alumina and a finely divided crystalline aluminosilicate.

CROSS-REFERENCES TO RELATED APPLICATIONS

This application is a continuation-in-part of our co-pending application, Ser. No. 232,905, filed on Mar. 8, 1972 now U.S. Pat. No. 3,697,393, which is, in turn, a division of our copending application, Ser. No. 56,008, filed on July 17, 1970, now U.S. Pat. No. 3,720,628 which is, in turn, a continuation-in-part of our copending application, Ser. No. 34,539, filed May 4, 1970, now U.S. Pat. 3,660,309, the teachings of all of which are specifically incorporated herein.

BACKGROUND OF THE INVENTION

This invention relates to a process for hydroisomerizing hydroisomerizable olefins. More particularly, this invention relates to a process for hydroisomerizing hydroisomerizable olefins with a catalytic composite comprising a platinum group component and a Group IV-A metallic component combined with a carrier material containing alumina and a finely divided crystalline aluminosilicate.

Hydroisomerization processes for the hydroisomerization of olefins have acquired significant importance within the petrochemical and petroleum refining industry. This importance stems, in part, from the need for branched paraffins such as isobutane, isopentane, and the isooctanes, either as motor fuels or intermediates for the production of high octane motor fuel alkylates, which can be met by hydroisomerizing the corresponding normal olefins.

SUMMARY OF THE INVENTION

Accordingly, it is an object of the present invention to provide a process for hydroisomerizing hydroisomerizable olefins. More specifically, it is an object of this invention to provide a hydroisomerization process utilizing a particular hydroisomerization catalyst effective in hydroisomerizing hydroisomerizable olefins in an active, selective and stable manner.

In a broad embodiment, this invention relates to a process for hydroisomerizing a hydroisomerizable olefin which comprises contacting said olefin, at hydroisomerization conditions, with a catalytic composite comprising catalytically effective amounts of a platinum group component and a Group IV-A metallic component combined with a carrier material containing alumina and a finely divided crystalline aluminosilicate. Preferably, the crystalline aluminosilicate utilized is mordenite and comprises about 0.5 to about 20 wt. percent of the carrier material with the carrier material being formed from an aluminum hydroxyl chloride sol, distributing a finely-divided crystalline aluminosilicate throughout the sol, gelling the resultant mixture to produce a hydrogel and calcining the resulting hydrogel. Further, the platinum group component is about 0.01 to about 2 wt. percent of the composite and the Group IV-A metallic component is about 0.01 to about 5 wt. percent of the composite.

DESCRIPTION OF PREFERRED EMBODIMENTS

The olefins applicable used in hydroisomerization process of this invention are generally mixtures of olefinic hydrocarbons of approximately the same molecular weight, including the 1-isomer, 2-isomer, and other position isomers, capable of undergoing hydroisomerization to a more branched chain paraffin. The process of this invention can be used to provide an isoparaffinic feedstock, for motor fuel alkylation purposes by converting a linear olefin such as a $C_4$–$C_5$ linear olefin to isobutane or isopentane. The process of this invention is applicable to the hydroisomerization of 1-butene, 2-butene, 1-pentene or 2-pentene. The process of this invention encompasses the hydroisomerization of olefins wherein the olefin is simultaneously hydrogenated and isomerized to produce a branched or more highly branched chain paraffin, as exemplified by hydroisomerization of a normal pentene (1-pentene, 2-pentene, etc.) to isopentane or the hydroisomerization of a normal hexene (1-hexene, 2-hexene, etc.) to a methyl pentane and/or dimethylbutanes. It is not intended to limit the scope of this invention to the foregoing enumerated olefinic hydrocarbons nor is it intended to limit the scope of this invention solely to the isomerization of linear olefins to isoparaffins. Included within the scope of this invention is the hydroisomerization of any olefinic hydrocarbon to a branched paraffin wherein the paraffin has a more branched carbon skeleton than the precursor olefin. Likewise, the hydroisomerization of low octane olefinic hydrocarbons to higher octane, more branched paraffins such as the hydroisomerization of a $C_7$–$C_9$ olefin to a higher octane paraffin is included within the generally broad scope of this invention. Hydroisomerization of $C_4$–$C_7$ monoolefins to corresponding carbon number, more branched chain paraffins is preferred.

The above described isomerizable olefinic hydrocarbons may be derived as selective fractions from various petroleum refinery streams, either as individual components, or as certain boiling range fractions obtained by fractionation and distillation of catalytically cracked gas oil. The process of this invention may be utilized for conversion of isomerizable olefins when these isomerizable olefins are present in minor quantities in various fluid or gaseous streams. Thus, the isomerizable olefinic hydrocarbons for use in the process of this invention need not be concentrated and may be in admixture with, for example, paraffins of the corresponding boiling range. Isomerizable olefinic hydrocarbons appear in minor quantities in various refinery streams, usually diluted with gases such as hydrogen, nitrogen, methane, ethane, propane, etc. These refinery streams, containing minor quantities of isomerizable olefinic hydrocarbons, are obtained in petroleum refineries and various refinery installations, e.g. thermal cracking units, catalytic cracking units, thermal reforming units, coking units, polymerization units, dehydrogenation units, etc. Such refinery offstreams have generally been burned for fuel value, since an economical process for the utilization of the olefinic hydrocarbon content has not been available.

As previously indicated the catalyst utilized in the present invention comprises a carrier material containing alumina and a crystalline aluminosilicate having combined therewith a platinum group component and a Group IV–A metallic component. In addition, in some cases, the catalyst may contain a halogen component, or a sulfur component, or a Friedel-Crafts metal halide component. Considering first the alumina utilized in the present catalyst, it is preferred that the alumina be a porous, adsorptive, high surface area material having a surface area of about 25 to about 500 m.$^2$/gm. Suitable alumina materials are the crystalline aluminas known as gamma-, eta-, and theta-alumina with gamma-alumina giving best results. In some cases the carrier material may contain minor proportions of other well-known refractory inorganic oxides such as silica, zirconia, magnesia, etc. The preferred carrier material comprises substantially pure gamma-alumina containing a minor proportion of a finely divided crystalline aluminosilicate.

It is essential that the carrier material contain a finely divided crystalline aluminosilicate. As is known to those skilled in the art, crystalline aluminosilicates (also known as "zeolites" and "molecular sieves") are composed of a three-dimensional interconnecting network structure of silica and alumina tetrahedra. The tetrahedra are formed by four oxygen atoms surrounding a silicon or aluminum atom, and the basic linkage of the tetrahedra is through the oxygen atoms. The tetrahedra are arranged in an ordered structure to form interconnecting cavities or channels of uniform size connected by uniform openings or pores. The ion-exhange property of these materials follows from the trivalent nature of aluminum which causes the alumina tetrahedra to be negatively charged and allows bonding of cations with them in order to maintain electrical neutrality in the structure. The molecular sieve properties of the zeolites results from the uniform size of the pores. The size of the pores can be correlated to the size of the molecules that are present in a mixture of molecules to separate molecules having a critical diameter less than or equal to the pore size of these zeolites. For purposes of the present invention, it is preferred to use crystalline aluminosilicates having pore sizes of at least 5 angstroms in cross-sectional diameter, and more preferably about 5 to about 15 angstrom units. Ordinarily, the zeolites are synthetically prepared in the alkali metal form with one alkali metal cation associated with each aluminum centered tetrahedra. This alkali metal cation may be thereafter ion-exhanged with polyvalent cations such as calcium, magnesium, beryllium, rare earth cations, etc. Another treatment of these alkali metal aluminosilicates involves ion-exchange with ammonium ions followed by thermal treatment, preferably about 300° F., to convert the aluminosilicate to the hydrogen form. When the zeolites contain a high mole ratio of silica to alumina, such as mordenite for example (above 5), the material may be directly converted to an acid form in a suitable acid medium.

Although in some cases the polyvalent form of the aluminosilicate may be used in the present invention, it is preferred to use the hydrogen form, or a form (for example, the alkali metal form) which is convertible to the hydrogen form during the course of the hereinafter described preferred procedure for incorporation of the crystalline aluminosilicates in the carrier material.

The preferred crystalline aluminosilicates for use in the present invention are the hydrogen and/or polyvalent forms of synthetically prepared faujacite and mordenite. We have found best results with synthetic mordenite having an effective diameter of about 6 angstrom units and a mole ratio of silica to alumina of about 9 to 10, particularly the hydrogen form of mordenite.

A particularly preferred crystalline aluminosilicate is acid-extracted mordenite having a $SiO_2/Al_2O_3$ ratio substantially above 10. One method of forming this material involves subjecting conventional mordenite, having a $SiO_2/Al_2O$ ratio of about 9 to 10, to the action of a strong acid such as hydrochloric acid, sulfuric acid, nitric acid, etc., at conditions effecting the removal or extraction of at least a portion of the aluminum from the mordenite. This procedure can be used to obtain mordenite having a $SiO_2/Al_2O_3$ ratio of about 11:1 to about 25:1 or more.

Regarding the method of incorporating the crystalline aluminosilicate (hereinafter abbreviated to CAS) into the carrier material, we have found that best results were obtained by adding the CAS directly into an aluminum hydroxylchloride sol prior to its use to form the alumina carrier material. An advantage of this method is the relative ease with which the CAS can be uniformly distributed in the resulting carrier material. Also, the sol appears to react with the CAS, causing some basic modification of the structure of the resulting material, giving it unusual ability to catalyze reactions which depend on carbonium ion intermediates.

Accordingly, the preferred method for preparing the carrier material involves forming an aluminum hydroxyl chloride sol by digesting aluminum in HCl to result in a sol having a weight ratio of aluminum to chloride of about 1 to about 1.4; evenly distributing the CAS throughout the sol; gelling the resultant mixture to produce a hydrogel or particles of a hydrogel; then finishing the hydrogel into the carrier material by standard aging, washing, drying and calcination steps. See U.S. Pat. No. 2,620,314 for details as to one preferred method of forming the resultant mixture into spherical particles.

The amount of CAS in the resulting carrier material is preferably about 0.05 to about 75 wt. percent and, more particularly, about 0.1 to about 20 wt. percent. For the isomerization embodiments, it is preferred to use about 1 to about 10 wt. percent CAS. By the expression "finely divided" it is meant that the CAS is used in a particle size having an average diameter of about 1 to about 100 microns, with best results obtained with particles of average diameter of less than 40 microns.

A preferred ingredient of the instant catalyst is a halogen component. Although the precise form of the chemistry of the association of the halogen component with the carrier material is not entirely known, it is customary in the art to refer to the halogen component as being combined with the alumina or with the other ingredients of the catalyst. This combined halogen may be either fluorine, chlorine, iodine, bromine, or mixtures thereof. Of these, fluorine and, particularly chlorine, are preferred for the purposes of the present invention. The halogen may be added to the carrier material in any suitable manner, either during preparation thereof or before or after the addition of the catalytically active metallic components. For example, the halogen may be added at any stage of the preparation of the carrier material or to the calcined carrier material, as an aqueous solution of a suitable halogen-containing compound such as hydrogen fluoride, hydrogen chloride, hydrogen bromide, etc. The halogen component, or a portion thereof, may be combined with the carrier material during the impregnation of the latter with the platinum group component; for example, through the utilization of a mixture of chloroplatinic acid and hydrogen chloride. In some cases, the aluminum hydroxylchloride hydrosol which is preferably utilized to form the carrier material inherently contains halogen and can contribute a portion of the halogen component to the final composite. The halogen is preferably combined with the carrier material in such a manner as to result in a final composite that contains about 0.1 to about 10 wt. percent and more preferably about 0.5 to about 5 wt. percent of halogen, calculated on an elemental basis.

It is essential that the catalyst contain a platinum group component. Although the process of the present invention is particularly directed to the use of a catalytic composite containing platinum or palladium, other platinum group metals such as rhodium, ruthenium, osmium and iridium may also be utilized. The platinum group component, such as platinum or palladium, may exist within the final catalytic composite as a compound, e.g. an oxide, sulfide, halide, etc., or as an elemental metal, or in combination with one or more of the other ingredients of the catalyst. Generally, the amount of the platinum group component present in the final catalyst is small compared to the quantities of the other components combined therewith. The platinum group metallic component generally comprises about 0.01 to about 2 wt. percent of the final catalytic composite, calculated on an elemental basis. Excellent results are obtained when the catalyst contains about 0.05 to about 1 wt. percent of the platinum group metal. This component is preferably platinum or a compound of platinum or palladium or a compound of palladium.

The platinum group component may be incorporated in the catalytic composite in any suitable manner such as coprecipitation or cogellation with the alumina carrier material, ion-exchange with the alumina hydrogel, or impregnation of the carrier material either after or before calcination of the alumina hydrogel, etc. The preferred method of incorporating this component involves the utilization of a soluble decomposable compound of a platinum group metal to impregnate the carrier material. The platinum group metal may be added to the carrier material by commingling the latter with an aqueous solution of chloroplatinic acid. Other water-soluble compounds of platinum may be employed as impregnation solutions and include ammonium chloroplatinate, bromoplatinic acid, platinum chloride, dinitrodiaminoplatinum, palladium nitrate, chloropalladic acid, etc. The utilization of a platinum chloride compound, such as chloroplatinic acid or chloropalladic acid, is preferred since it facilitates the incorporation of both the platinum group component and at least a minor quantity of the preferred halogen component in a single step. Hydrogen chloride or the like acid is also generally added to the impregnation solution in order to further facilitate the incorporation of the halogen component and the distribution of the metallic components. It is generally preferred to impregnate the carrier material after it has been calcined in order to minimize the risk of washing away the valuable platinum metal compounds. But in some cases it may be advantageous to impregnate the carrier material when it is in a gelled state.

Another essential component of the instant catalyst is the Group IV–A metallic component. By the use of the generic term "Group IV–A metallic component," it is intended to include the metals and compounds of the metals of Group IV–A of the Periodic Table. It is particularly intended to include germanium and the compounds of germanium; tin and the compounds of tin, lead and the compounds of lead, and mixtures of these metals and/or compounds of metals. This Group IV–A metallic component may be present in the catalyst as an elemental metal, or in chemical combination with one or more of the other ingredients of the composite, or as a chemical compound of the Group IV–A metal such as the oxide sulfide, halide, oxyhalide, oxychloride, aluminate and the like compounds. It is believed that best results are obtained when the Group IV–A metallic component exists in the final composite in an oxidation state above that of the elemental metal. The subsequently described oxidation and reduction steps preferably used in the preparation of the composite are believed to result in a catalytic composite which contains an oxide of the Group IV–A metallic component such as germanium oxide, tin oxide or lead oxide. Regardless of the oxidation state in which this component exists in the composite, it can be utilized in any amount which is catalytically effective, with the preferred amount being about 0.01 to about 5 wt. percent thereof, calculated on an elemental basis. The exact amount selected within this broad range is preferably determined as a function of the particular Group IV–A metal utilized. For instance, where this component is lead, it is preferred to select the amount of lead from the low end of the range, about 0.01 to about 1 wt. percent. It is also preferred to select the amount of lead as a function of the amount of the platinum group component, as will be explained hereinafter. In the case where this component is tin, it is preferred to select from a relatively broad range of about 0.05 to about 2 wt. percent. In the preferred case where this component is germanium, the selection is made from the full breadth of the stated range, about 0.01 to about 5 wt. percent, with best results at about 0.05 to about 2 wt. percent. This Group IV–A component may be incorporated in the composite in any suitable manner known to the art, e.g. by coprecipitation or cogellation with the carrier material, ion-exchange with the carrier material, or impregnation of the carrier material at any stage in its preparation. The particular method of incorporation used is not deemed to be essential. However, best results are believed to be obtained when the Group IV–A component is uniformly distributed throughout the carrier material. One method of incorporating the Group IV–A component into the catalytic composite involves cogelling the Group IV–A component during the preparation of the carrier material. This method includes the addition of a suitable soluble compound of the Group IV–A metal to the alumina hydrosol. The resulting mixture is then commingled with a suitable gelling agent, such as a relatively weak alkaline reagent, and the mixture is thereafter preferably gelled by dropping into a hot oil bath as explained hereinbefore. After aging, drying and calcining the resulting particles, an intimate combination of the oxide of the Group IV–A metal and alumina results. One preferred method of incorporating this component into the composite involves utilization of a soluble, decomposable compound of the particular Group IV–A metal to impregnate the carrier material either before, during or after the carrier material is calcined. In general, the solvent used during this impregnation step is selected for its ability to dissolve the desired Group IV–A compound without affecting the carrier material to be impregnated. Good results are obtained when water is the solvent. The preferred Group IV–A compounds for use in this impregnation step are water-soluble and decomposable. Examples of suitable Group IV–A compounds are germanium difluoride, germanium tetrafluoride, germanium monosulfide, tin dibromide, tin dibromide di-iodide, tin dichloride di-iodide, tin chromate, tin difluoride, tin tetrafluoride, tin tetra-iodide, tin sulfate, tin tartrate, lead acetate, lead bromate, lead bromide, lead chlorate, lead chloride, lead citrate, lead formate, lead lactate, lead malate, lead nitrate, lead nitrite, lead dithionate, and the like compounds. Where the Group IV–A component is germanium, a preferred impregnation solution is germanium tetrachloride dissolved in anhydrous ethanol. For tin, tin chloride dissolved in water is preferred. Regardless of which impregnation solution is utilized, the Group IV–A component can be impregnated at the same time, or before or after platinum group component is added to the carrier material. Generally, best results are obtained when this component is impregnated simultaneously with the platinum group component. Best results are ordinarily obtained when the Group IV–A component is germanium or a compound of germanium.

It is important that the Group IV–A metallic component be uniformly distributed throughout the carrier material. In order to achieve this, it is necessary to maintain the pH of the impregnation solution in a range of about 1 to about 7 and to dilute the impregnation solution to a volume which is substantially in excess of the volume of the carrier material which is impregnated. It is preferred to use a volume ratio of impregnation solution to carrier material of at least 1.5:1 and preferably about 2:1 to about 10:1 or more. It is also preferred to use a relatively long contact time for the impregnation step, e.g. about ¼ hour up to about ½ hour or more, before drying to remove excess solvent to insure a high dispersion of the Group IV–A metallic component on the carrier material.

The carrier material is preferably constantly agitated during this impregnation step.

Regarding the preferred amounts of the metallic components of the catalyst, it is a good practice to specifiy the amount of the Group IV–A metallic component as a function of the amount of the platinum group component. Broadly, the amount of the Group IV–A metallic component should be sufficient to result in an atomic ratio of Group IV–A metal to platinum group metal falling within the range of about 0.05:1 to about 10:1. More specifically, it is preferred to select this ratio from the following ranges for the individual Group IV–A species: (1) germanium, about 0.3:1 to 10:1, with the best results at about 0.6:1; (2) tin, about 0.1:1 to 3:1 with best results at about 0.5:1 to 1.5:1; and (3) lead, about 0.05:1 to 0.9:1 with best results at about 0.1:1 to 0.75:1.

Regardless of how the components of the catalyst are combined with the carrier material, the final catalyst generally is dried at a temperature of about 200 to about 600° F. for a period of about 2 to about 24 hours or more, and finally calcined at a temperature of about 700° F. to about 1100° F. in an air atmosphere for about 0.5 to about 10 hours to convert the metallic components substantially to the oxide form. Best results are generally obtained when the halogen content of the catalyst is adjusted during the calcination step by including a halogen-containing compound in the air atmosphere utilized. When the desired halogen component of the catalyst is chlorine, it is preferred to use a mole ratio of $H_2O$ to HCl of about 20:1 to about 100:1 during at least a portion of the calcination step to adjust the final chlorine content of the catalyst to a range of about 0.1 to about 10 wt. percent.

Although not essential, the resulting calcined catalytic composite may be impregnated with an anhydrous Friedel-Crafts type metal halide, particularly aluminum chloride. Other suitable metal halides include aluminum bromide, ferric chloride, ferric bromide, zinc chloride, beryllium chloride, etc. It is preferred that the porous carrier material of alumina and CAS contain chemically combined hydroxyl groups. The presence of chemically combined hydroxyl groups in the porous carrier material allows a reaction to occur between the Friedel-Crafts metal halide and the hydroxyl groups of the carrier material. For example, aluminum chloride reacts with the hydroxyl groups of the alumina and CAS to yield Al—O—$AlCl_2$ active centers which enhance the catalytic behavior of the original composite. It is desired that the combined halogen content presently within the calcined composite be within the lower portion of the 0.1 to 10 wt. percent halogen range and this combined halogen substitutes to some degree for the hydroxyl groups which are necessary for the reaction with the Friedel-Crafts metal halide.

The Friedel-Crafts metal halide can be impregnated onto the calcined catalytic composite containing combined hydroxyl groups by the sublimation of the halide onto the composite under conditions such that the sublimed metal halide is combined with the hydroxyl groups of the composite as illustrated by U.S. Pat. No. 2,999,074. This reaction is typically accompanied by the elimination of about 0.5 to about 2.0 moles of hydrogen chloride per mole of Friedel-Crafts metal halide reacted. For example, in the case of subliming aluminum chloride which sublimes at about 184° C., suitable impregnation temperatures range from about 190° C. to about 700° C., preferably from about 200° C. to about 600° C. The sublimation can be conducted at atmospheric pressure or under increased pressure and in the presence of diluents such as inert gases, hydrogen, and/or light paraffinic hydrocarbons. This impregnation may be conducted batchwise, but a preferred method is to pass sublimed $AlCl_3$ vapors, in admixture with an inert gas such as hydrogen, through a calcined catalyst bed. This method continuously deposits the aluminum chloride and removes the evolved HCl.

The amount of halide combined with the composite may range from about 1% to about 100% of the original metal halide-free composite. The final composite has unreacted metal halide removed by treating the composite at a temperature above the sublimation temperature of the halide for a time sufficient to remove therefrom any unreacted metal halide. For $AlCl_3$, temperatures of about 400° C. to about 600° C. and times of from about 1 to about 48 hours are sufficient.

It is preferred that the resulting calcined catalytic composite be subjected to a substantially water-free reduction step prior to its use in the conversion of olefins. This insures a uniform and finely divided dispersion of the platinum group component throughout the carrier material. Preferably, substantially pure and dry hydrogen (less than 20 vol. p.p.m. $H_2O$) is used as the reducing agent in this step. The reducing agent is contacted with the calcined catalyst at conditions including a temperature of about 800° F. to about 1200° F. and times of about 0.5 to about 10 hours or more selected to reduce at least the platinum group component to the elemental metallic state. This reduction treatment may be performed in situ as part of a start-up sequence if precautions are taken to predry the plant to a substantially water-free state and if substantially water-free hydrogen is used.

Although it is not essential, the reduced catalytic composite may, in many cases, be beneficially subjected to a catalytic composite from about 0.05 to about 0.5 wt. percent sulfur calculated on an elemental basis. Preferably, this presulfiding treatment takes place in the presence of hydrogen and a suitable sulfur-containing compound such as hydrogen sulfide, lower molecular weight mercaptans, organic sulfides, etc. Typically, this procedure comprises treating the reduced catalyst with a sulfiding gas, such as a mixture of hydrogen and hydrogen sulfide in a mole ratio of about 10:1 moles of $H_2$ per mole of $H_2S$, at conditions sufficient to effect the desired incorporation of sulfur, generally including a temperature ranging from about 50° F. up to about 1100° F. or more. It is generally preferred to perform this optional presulfiding step under substantially water-free conditions.

According to the present invention, the isomerizable olefinic hydrocarbon charge stock and hydrogen are contacted with a catalyst of the type described above in a hydroisomerization zone at hydroisomerization conditions. This contacting may be accomplished by using the catalyst in a fixed bed system, a moving bed system, a fluidized bed system, or in a batch type operation. In view of the danger of attrition losses of the valuable catalyst and of well-known operational advantages, it is preferred to use a fixed bed system. In this system, a hydrogen-rich gas and the charge stock are preheated by any suitable heating means to the desired reaction temperature and then are passed into a hydroisomerization zone containing a fixed bed of the catalyst type previously characterized. The isomerization zone may be one or more separate reactors with suitable means to insure that the desired isomerization temperature is maintained at the entrance to each reactor. The reactants may be contacted with the catalyst bed in either upward, downward, or radial flow. The reactants may be in the liquid phase, a mixed liquid-vapor phase, or a vapor phase when they contact the catalyst, with best results obtained using the vapor phase.

The process of this invention is preferably effected in a continuous flow, fixed bed system. One particular method is to continuously pass the olefin, in admixture with hydrogen, to a reaction zone containing the catalyst while maintaining the zone at proper hydroisomerization conditions. When effecting the hydroisomerization reaction (i.e., conversion of the olefin to a branched or more highly branched paraffin) hydrogen to hydrocarbon mole ratios of at least 1:1 are preferred. Particularly preferred are hydrogen to hydrocarbon mole ratios of 2:1 to about 10:1 or more. The hydrocarbon is passed over the catalyst at a liquid hourly space velocity (defined as volume of liquid hydrocarbon passed per hour per volume of catalyst) of about 0.1 to about 20 hr.$^{-1}$ or more. In addition, diluents such as argon, nitrogen, etc., may be present. The hydroisomerized product is continuously withdrawn, separated from the reactor effluent, and recovered by conventional means, preferably fractional distillation, while the unreacted starting material may be recycled to form a portion of the feedstock. Particular conditions to be utilized for the hydroisomerization of olefins to a more branched paraffin include temperatures of about 0° C. to about 500° C., and pressures of about atmospheric to about 200 atmospheres. Preferred conditions for hydroisomerization include a pressure of 10 to 100 atmospheres, temperature of 100° C. to about 400° C., and hydrogen to hydrocarbon mole ratio of about 2:1 to about 10:1 or more. In effect, hydrogenating as well as isomerization conditions are employed simultaneously in hydroisomerization in a manner known to those trained in the art.

ILLUSTRATIVE EMBODIMENTS

The following illustrative embodiments are presented to describe the preparation of the catalyst composite utilized in the process of this invention and its use in the hydroisomerization of olefinic hydrocarbons. These illustrations are not intended as a limitation on the scope of this invention but as a further illustration of the embodiments of the present process.

ILLUSTRATION I

Aluminum metal having a purity of 99.9 wt. percent is digested in hydrochloric acid to produce an aluminum hydroxylchloride sol having a weight ratio of Al/Cl of about 1.15 and a specific gravity of 1.3450. An aqueous solution containing 28 wt. percent HMT (i.e. hexamethylenetetramine) is made up, and 700 cc. of the HMT solution is then added to 700 cc. of the sol to form a dropping solution. About 10 grams of the hydrogen form of mordenite in the form of a fine powder is added to the resulting dropping solution and uniformly distributed therein. Another portion of the mordenite is chemically analyzed and contains 11.6 wt. percent $Al_2O_3$, 87.7 wt. percent $SiO_2$ and 0.2 wt. percent Na. Still another portion of the mordenite is analyzed for particle size distribution. The results show that 57.6 wt. percent of the powder is between 0 to 40 microns in size and 82.1 wt. percent of the powder is beween 0 and 60 microns in size.

The dropping solution containing the dispersed mordenite is passed through a vibrating dropping head and dropped in discrete particles into a forming oil maintained at 95° C. The rate of vibration and the volumetric flow of dropping solution is set to produce finished spherical particles of about 1/16 inch in diameter. The dropped particles are aged in oil overnight (about 16 hours), separated from the oil and aged in an ammoniacal solution at 95° C. for about 3 hours. The aged spherical particles are then water washed to remove neutralization salts and dried. The particles are thereupon calcined at 600° C. for 4 hours in dry air to give a carrier material having an apparent bulk density of between 0.4 and 0.5 gm./cc.

A measured amount of germanium tetrachloride is then dissolved in anhydrous ethanol. The resulting solution is then aged at room temperature until an equilibrium condition is established therein. Another aqueous solution containing chloroplatinic acid and hydrogen chloride is then prepared. The two solutions are then intimately admixed to prepare an impregnation solution.

About 250 cc. of the impregnation solution is then placed in a steam-jacketed rotating vessel and about 350 cc. of the carrier material is added thereto. The vessel is then heated and rotated until all the liquid solution is evaporated. The resulting catalyst particles are then subjected to an oxidation treatment in an air atmosphere at a temperature of 1025° F. for about 1 hour. The resulting catalyst particles are then analyzed and found to contain, on an elemental basis, about 0.375 wt. percent platinum, about 0.75 wt. percent chlorine, and about 0.5 wt. percent germanium. In addition, the alumina carrier material is found to contain about 5 wt. percent of the hydrogen form of mordenite.

ILLUSTRATION II

A portion of the catalyst as prepared in Illustration I is charged to an appropriate hydroisomerization reactor maintained at a temperature of about 220° C. and a pressure of about 450 p.s.i.g. A 4:1 hydrogen to 2-pentene mole ratio charge stock continuously passed to the reactor with a conversion to isopentane observed.

ILLUSTRATION III

A further portion of the catalyst as prepared in Illustration I is charged to a conventional pilot plant maintained at a temperature of about 300° C. and a pressure of 600 p.s.i.g. A 5:1 hydrogen to 1-butene/2-butene mole ratio charge stock is continuously passed to the reactor with conversion to isobutane observed.

We claim as our invention:

1. A process for the conversion of an isomerizable olefinic hydrocarbon to a highly branched chain paraffin which comprises contacting said olefinic hydrocarbon, in admixture with hydrogen, at hydroisomerization conditions which include a temperature of about 100° C. to about 450° C., a pressure of about 30 atmospheres to about 200 atmospheres and a hydrogen to olefin mole ratio of at least 1:1, with a catalytic composite comprising catalytically effective amounts of a platinum group component and a Group IV-A metallic component combined with a carrier material containing alumina and a finely-divided crystalline aluminosilicate.

2. The process of claim 1 further characterized in that said olefinic hydrocarbon is a linear pentene and said paraffin is a branched pentane.

3. The process of claim 1 wherein said olefinic hydrocarbon is linear hexene and said paraffin is branched hexane.

4. The process of claim 1 wherein said Group IV-A metallic component is germanium or a compound of germanium.

5. The process of claim 1 wherein said Group IV-A metallic component is tin or a compound of tin.

6. The process of claim 1 wherein said Group IV-A metallic component is lead or a compound of lead.

7. The process of claim 1 wherein said crystalline aluminosilicate is the hydrogen form of mordenite.

8. The process of claim 1 wherein said crystalline aluminosilicate comprises about 0.5 to about 20 wt. percent of the carrier material.

References Cited

UNITED STATES PATENTS

| | | | |
|---|---|---|---|
| 3,409,682 | 11/1968 | Mitsche | 260—666 |
| 3,660,309 | 5/1972 | Hayes et al. | 252—442 |
| 3,432,568 | 3/1969 | Miale et al. | 260—676 R |
| 3,201,356 | 8/1965 | Kress et al. | 260—676 R |
| 3,751,502 | 8/1973 | Hayes et al. | 260—668 A |

DELBERT E. GANTZ, Primary Examiner

J. M. NELSON, Assistant Examiner

U.S. Cl. X.R.

260—683.2